United States Patent [19]

Herve

[11] Patent Number: 4,471,216
[45] Date of Patent: Sep. 11, 1984

[54] SYSTEM AND PROCESS FOR IDENTIFICATION OF PERSONS REQUESTING ACCESS TO PARTICULAR FACILITIES

[75] Inventor: Robert J. L. Herve, Versailles, France

[73] Assignee: Compagnie Internationale pour l'Informatique CII-Honeywell Bull (Societe Anonyme, Paris, France

[21] Appl. No.: 200,785

[22] Filed: Oct. 27, 1980

[30] Foreign Application Priority Data

Nov. 9, 1979 [FR] France ................................ 79 27705

[51] Int. Cl.³ .......................................... G06K 19/06
[52] U.S. Cl. .................................... 235/380; 235/379; 235/375; 235/487; 235/492
[58] Field of Search ............... 235/379, 380, 487, 492

[56] References Cited

U.S. PATENT DOCUMENTS 4,234,932 11/1980 Gorgens ............................... 364/900
4,268,715 5/1981 Atalla .................................... 178/22
4,281,215 7/1981 Atalla .............................. 178/22.08
4,283,599 8/1981 Atalla .................................. 178/22.1
4,295,039 10/1981 Stuckert .............................. 235/380

Primary Examiner—Gene Z. Rubinson
Assistant Examiner—Robert Lev
Attorney, Agent, or Firm—Kerkam, Stowell, Kondracki & Clarke

[57] ABSTRACT

The user has a credit card incorporating electronic devices and/or circuits. The facility which is to be protected has an electronic device and/or circuit analogous to that of the credit card. The devices of the credit card and of the facility contain in their respective memories a secret code S, an identification code $I_n$, and a program p. The facility which is to be protected has available a generator of a random code E which is transmitted into each of the devices when a request for access is made. The devices within the card and the facility each calculate the function $R = p(S, E, I_n)$, and a comparator situated in the facility which is to be protected compares the functions supplied by each of the devices to allow or deny access of the person to the said facility.

7 Claims, 2 Drawing Figures

SYSTEM AND PROCESS FOR IDENTIFICATION OF PERSONS REQUESTING ACCESS TO PARTICULAR FACILITIES

BACKGROUND OF THE INVENTION

1. Field of the Invention

The present invention relates to a system and a process for identification of persons requesting access to particular facilities.

2. Description of the Prior Art

Systems which allow authorized persons to have access to facilities either by means of a particular password or by means of a portable object, such as an identification or pass card, badge, key or the like, or possibly by means of both are well known. For example, reference may be made to U.S. Pat. Nos. 3,609,300, 3,748,441; 3,806,882; 3,868,057; 3,870,866; 3,906,460; 3,971,916; 4,007,355; 4,092,524; 4,102,493 and 4,105,156, which show various systems and devices for establishing access to a secured system through means of a portable identification card.

These systems have two major disadvantages. On the one hand, a facility must be informed if the authorization of a person is to be withdrawn since a person once given a password cannot be forced to forget his or her password. Further, once having been issued a pass card, or the like, that person has had the opportunity to copy or counterfeit his means of access to the facility. On the other hand, a cheat may, unbeknown to the authorized person, steal the password and/or copy or counterfeit the portable object, and these frauds cannot be detected with certainty.

The present invention enables these shortcomings to be eliminated, thanks to a portable object, such as an access card, which at the same time, is not reproducible, cannot be counterfeited and cannot be memorized. Under these circumstances it is possible to deprive a person of his or her authorization to a facility without actually informing the restricted facilities, simply by withdrawing or calling back his or her portable object. With an access card, a cheat must necessarily perform a physical theft of the card to gain access to the facility and this fraud may thus be detected.

SUMMARY OF THE INVENTION

In accordance with the present invention, the portable object may be a plastic card incorporating electronic devices and/or circuits and the facility to be protected has an electronic device and/or circuit analogous to that used in conjunction with the portable object of the persons wishing to have access to the facility. The electronic device of each portable object comprises at least one memory wherein is recorded a secret code S, an identification code $I_n$ and a fixed program p, and the memory of the facility contains a corresponding secret code S, identification code $I_n$, and fixed program p. The facility to be protected includes means for reading the identification code $I_n$ stored in the portable object memory when a connection is established between the portable object and the electronic device of the facility. The facility also includes a generator of a random code or number E. The random number E is transmitted, on the one hand to the electronic device of the portable object requesting access and, on the other hand, to the analogous electronic device within the facility. Each of the devices thereupon supplies a signal R as a function of the program p, of the secret code S and of the identification code $I_n$ which are contained in both their memories. The signals R thus delivered are then compared within the facility and, if the comparison is satisfactory, access to the facility is then authorized.

The advantage of the present invention is that it enables a facility or installation to identify a portable object such as an access card with a very high level of security. The process utilized is the following: The facility reads within the memory of the access card the identification code $I_n$ recorded therein and generates a random number E. The facility having available an electronic device analogous to that of the portable object, calculates for its part the function $R = p(S, E, I_n)$. This calculation being completed, it thereupon offers the random number E to the electronic device of the portable object which is to be identified, whereinafter it checks back on the correspondence of the results obtained.

In these circumstances, a cheat having a counterfeit access card which nevertheless correctly generates the identification code $I_n$, is rejected by virtue of the test performed on the resultant R which, to be obtained, requires taking into account the secret code S.

At another level of fraud, a legal access card bearing the identity $I_n$ cannot be used to establish another identity $I_n$.

BRIEF DESCRIPTION OF THE DRAWINGS

The invention will be better understood from the following description given by way of example, with reference to the accompanying drawings, in which.

DETAILED DESCRIPTION OF THE PREFERRED EMBODIMENT

Figure 1:
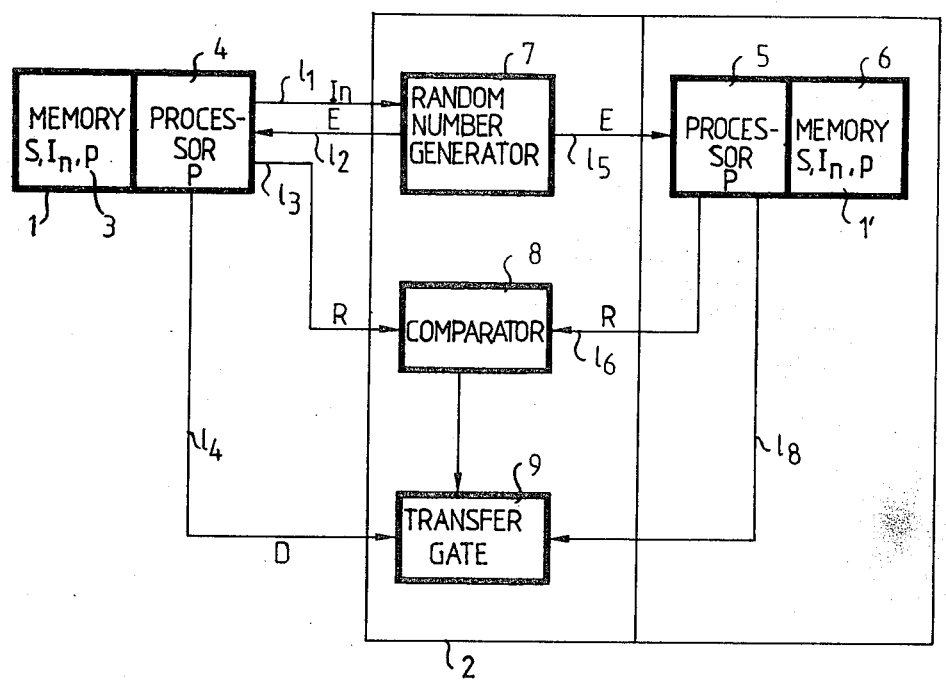
FIG. 1 is a simplified block diagram illustration of one embodiment of the present invention.

The system illustrated in FIG. 1 comprises a portable object 1 and an apparatus or facility 2. The portable object 1 may take the form of a plastic credit card and comprises at least one memory 3 associated with processing means 4. The processing means 4 may consist of a microprocessor chip embodied in the credit card such as is described in commonly-assigned Ugon U.S. Pat. No. 4,211,919, the entire disclosure of which is hereby incorporated by reference herein. A further example of such a credit card suitable for use in combination with the present invention is described in commonly-assigned Badet et al. U.S. Pat. No. 4,222,516, the entire disclosure of which is also incorporated by reference herein. The apparatus or facility 2 comprises an electronic device 1' similar to that contained in portable object 1, which device 1' comprises a memory 6 and processing means 5. Facility 2 further includes a random number generator 7, a comparator 8 and a transfer gate 9.

In the case of FIG. 1, the facility 2 to be protected or more accurately that part of the facility 2 to be protected is the memory 6, access to which is controlled. The portable object 1 may be connected electrically to the random code generator 7 via the lines $1_1$ and $1_2$, to the comparator 8 via the line $1_3$, and to the transfer gate 9 via the line $1_4$, when access to the memory 6 is requested. The electronic device 1' is connected to the random code generator 7 via the line $1_5$, to the comparator 8 via the line $1_6$, and to the transfer gate 9 via the line $1_8$. The memory 3 of the portable object 1, as well as the memory 6 of the electronic device 1', each contain a secret code S, a fixed program p and an identification code $I_n$. The memories are divided into three zones, i.e., a secret zone in which reading and writing are permitted only by the internal processor and in which the secret code S and the program p may be stored, a read zone where only reading operations are permitted and in which the identification code $I_n$ may be stored, and a working zone in which any reading and writing operation is permitted.

The insertion of the portable object 1 into a suitable card-receiving adapter provided in the facility 2 causes the reading of the identification code $I_n$ from the memory 3 of the portable object 1. This identification code $I_n$ is applied on line $1_1$. If the identification code $I_n$ is plausible, the generator 7 generates a random number E which is transmitted to the portable object 1 on line $1_2$ and is transmitted to the electronic device 1' on line 15. The microprocessors comprising the processing means 4 and the processing means 5 then each calculate a number R which is a function of the secret code S, of the program p, and of the identification code $I_n$ present in each of the memories 3 and 6, as well as of the generated random code E.

While in no way intended to limit the scope of the invention, the information stored in the respective memories 3 and 6 and operated on by the processors 4 and 5 may be better understood by means of the following specific example.

First, the data words have the following lengths in this specific example: The identification codes $I_n$ are 32 bits long; the random number E is also 32 bits long; and the secret codes S are 64 bits long. The result of the computation, R, is 64 bits long.

The computation effected by the instructions comprising the stored programs p executed in the microprocessors 4 and 5 has the following three overall steps:

(1) First, an intermediate result, $R_1$, is calculated by concatenating E with $I_n$. $R_1 = (E, I_n)$.
(2) Second, another intermediate result, $S_1$, is calculated by an exclusive-OR operation of $R_1$ with S. $S_1 = R_1 \oplus S$.
(3) Third, the result, R, is calculated by multiplying S with $S_1$ with $R_1$, modulo $2^{64} - 1$. $R = S \times S_1 \times R_1$, modulo $2^{64} - 1$.

This computation can be performed in a microprocessor carried on a card such as is disclosed in the above-referenced Ugon U.S. Pat. No. 4,211,919. By way of example, a suitable commercially-available memory device which may be employed as the memories 1 and 6 is a Mostek Type No. MK4022. Similarly, the microprocessors 4 and 5 may each comprise an Intel Type No. 8080 or an Intel Type No. 8085.

The following lists one form of machine-language program which may be employed as the programs p. This program listing assumes that registers denoted A, B, C, D and T (not shown) are available:

EXAMPLE PROGRAM LISTING

| | Instructions | Comments |
| --- | --- | --- |
| 001 | Load $I_n$ A | Load registers A, B and C with the parameters $I_n$, E, S |
| 002 | Load E B | |
| 003 | Load S C | |
| 004 | MOV B A | Concatenate E with $I_n$ to generate $R_1$, and leave in register A |
| 005 | MOV A, T | Also store $R_1$ in register T |
| 006 | X CT | $S_1 = R_1 \oplus S$, to T |
| 007 | MUL (T C) | $S \times S_1$ to T |
| 008 | MUL (T A) | $R = S \times S_1 \times R_1$ to T |
| 009 | Load $2^{64} - 1$ D | Load value $2^{64} - 1$ into register D |
| 010 | COMP (T, D) | if $R \geq 2^{64} - 1$ |
| 011 | IF (1) | return to 1 |
| 012 | END | |

Signals corresponding to the number R are output on each of the lines $1_3$ and $1_6$. Both signals are fed to comparator 8 which compares the signals. If the relationship between the two R numbers represented by the signals is acceptable, the comparator 8 transmits a control signal to the transfer gate 9 on the line $1_7$ to authorize the transfer of data between the portable object 1 and the electronic device 1' via lines $1_4$ and $1_8$. The function for effecting a proper comparison of the number R may be selected in a wholly optional manner. For example, the function may be one of equality wherein when the comparator 8 determines that the two numbers are equal, a transfer is initiated. However it should be obvious that it is possible to select many other logic functions. It is thus apparent that a (counterfeited) portable object such as a credit card produced by a cheat has every chance of generating a signal characteristic of an erroneous result since the latter result is based neither on the secret code S, nor on the program p.

On the other hand, it will be observed that the value of the random number E is never the same in the course of time, and that it cannot be predicted. The result of the R calculation which corresponds to each value of random number E consequently also varies continuously in the course of time, and is equally unforeseeable, which renders any attempted fraud ineffective.

Figure 2:
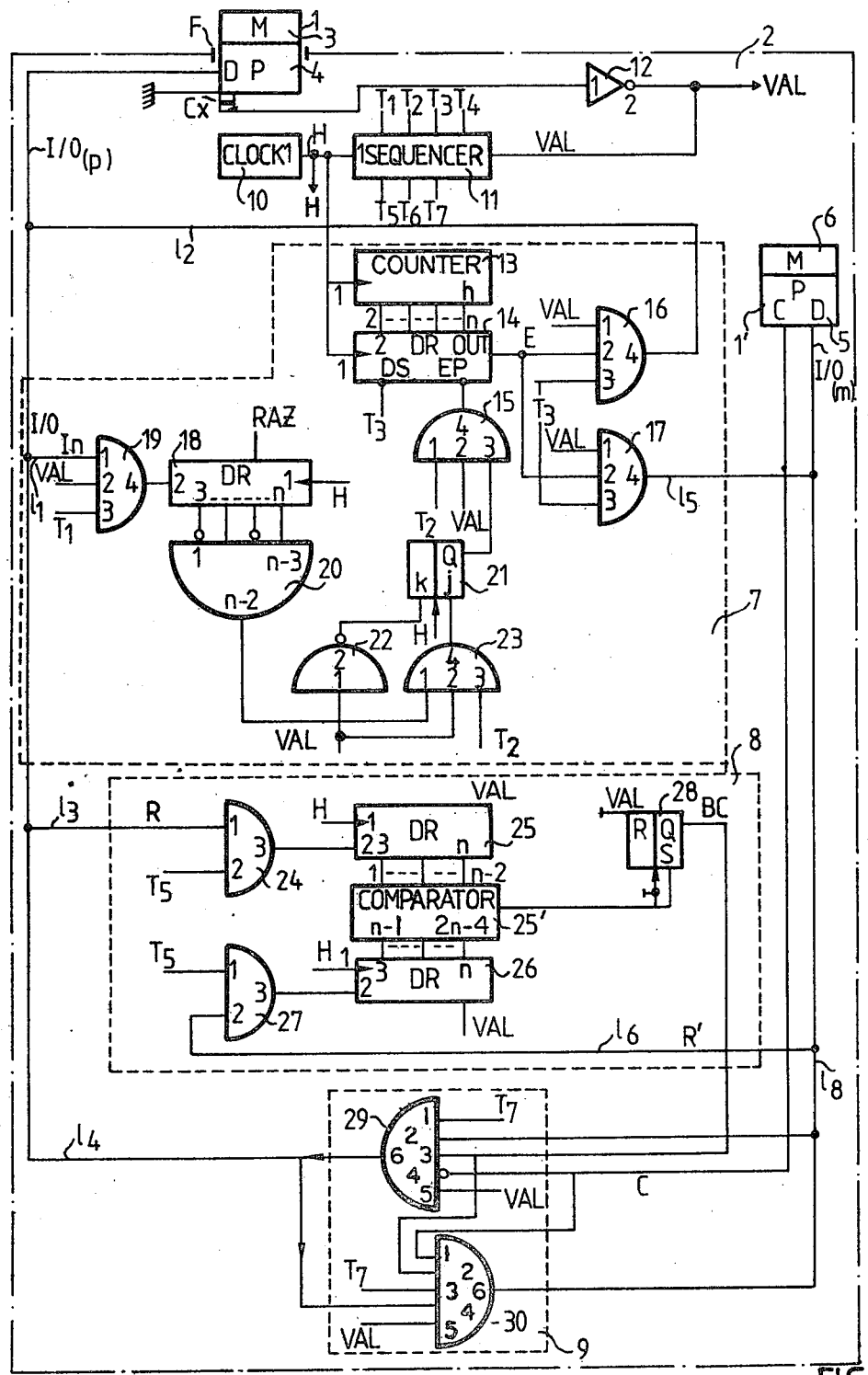
FIG. 2 is a detailed circuit illustration of the embodiment of FIG. 1.

The device illustrated in FIG. 2 shows a portable object 1 such as a credit card comprising a memory 3 and a processor 4. Memory 3 and processor 4 may be a single or multiple chip device. The portable object 1 or credit card is inserted via the slot F into the apparatus 2. The apparatus comprises a normally open switch contact $C_x$ adapted to be closed upon insertion of a card 1 into slot F by which the apparatus 2 recognizes that a portable object 1 has just been inserted through the slot F. One terminal of this contact $C_x$ is connected to the ground of the apparatus 2. The other terminal is connected to the input 1 of the inverter 12 which, at its output 2, delivers a validating signal VAL to one of the inputs of a sequencer 11. Another input of the sequencer 11 is connected to receive the signals supplied at the output 1 of a clock 10 such that the sequencer 11 is driven by the clock signals. The clock 10 may be a conventional transistorized multivibrator. Sequencer 11 may comprise flip-flops connected in ring configuration, also in a conventional manner well known in the art. The sequencer 11 applies the synchronizing signal via its outputs $T_1$ through $T_7$ to the system as a whole.

For convenience, the components making up the random code generator device 7, the comparator device 8 and the transfer gate device 9 are outlined in FIG. 2 by equal length dash lines. Referring now to FIG. 2, the generator 7, the output of which is the random code signal E, comprises a ring counter 13 having $n-1$ flip-flops, controlled via the output H of the clock generator 10. The outputs 2 to n of counter 13 are connected, respectively, to the parallel inputs 2 to n of a shift register DR 14. The shift register 14 is driven via its input 1 by the output H of the clock generator 10. The input DS of the shift register 14 receives the signal $T_3$ from the sequencer 11 to control the shift in series towards the right of the data bits contained in the shift register 14. The input EP of the shift register 14 is connected to the output 4 of an AND gate 15 to control the transfer of the data bits present on the parallel inputs 2 to n into the shift register 14. The random number signal E emerges from the shift register 14 via its output marked "out" and is applied to the inputs 2 of the AND gates 16 and 17.

The AND gates 16 and 17 receive, at their inputs 1, the validating signal VAL supplied by the output of the inverter 12 and, at their inputs 3, the synchronizing signal $T_3$ supplied by the sequencer 11. The output 4 of the AND gate 16 supplies the random number signal E on line $1_2$ when the AND gate 16 inputs 1 and 3 are activated simultaneously by the signals VAL and $T_3$ and random number signal E is present at AND gate 16 input 2. Likewise, the output 4 of the AND gate 17 delivers the random number signal E on the line $1_5$ when the AND gate 17 inputs 1 and 3 are activated simultaneously by the signals VAL and $T_3$.

The AND gate 15 is controlled via its input 1 by the synchronizing signal $T_2$ transmitted by the sequencer 11, via its input 2 by the VAL signal transmitted from the output terminal of the inverter 12, and via its input 3 by a control signal transmitted by the Q output terminal of the JK flip-flop 21. The flip-flop 21 is synchronized by the output signal H derived from the clock generator 10, the Q output of flip-flop 21 assumes the logic "1" state when the J input terminal is activated, and assumes the Logic "0" state when its K input terminal is activated. The J input of the flip-flop 21 is connected to the AND gate 23 output 4, which AND gate 23 respectively receives at inputs 1, 2 and 3, a signal transmitted from the n−2 output of the decoder 20, the VAL signal from inverter 12, and the synchronizing signal $T_2$ supplied by the sequencer 11.

The K input of flip-flop 21 is connected to receive the output of inverter 22 which receives at its input the VAL signal from inverter 12. The inputs 1 to n−3 of the decoder 20 are connected respectivley to the outputs 3 to n of the shift register DR 18. The register 18 is synchronized via its input 1 by the signal H transmitted from the clock generator 10 and is connected at its input 2 to the output 4 of the AND gate 19. AND gate 19 respectively receives at its inputs 1, 2 and 3, the signals of the identification code $I_n$ transmitted on the line 11, the VAL signal transmitted from the inverter 12 and the $T_1$ signal from the sequencer 11.

The comparator device 8 comprises a comparator 25' having inputs 1 to n−2 connected, respectively, to the outputs 3 to n of a shift register 25, and the inputs n−1 to 2n−4 connected, respectively, to the outputs 3 to n of a shift register DR 26. The shift registers 25 and 26 are synchronized by the synchronizing signal H supplied by the clock generator 10 and activated by the VAL signal transmitted from the No. 2 output of inverter 12. The input 2 of the shift register 25 is connected to the output 3 of the AND gate 24. Gate 24 has its inputs 1 and 2 connected to respectively receive the R result signal transmitted via line 13 and the synchronizing signal T5. Input 2 of the shift register 26 is connected to the output 3 of AND gate 27 which respectively receives at its inputs 1 and 2, the synchronizing signal T5 transmitted from the sequencer 11 and the R' result signal transmitted on the line $1_6$. When the contents of the registers 25 and 26 are identical, as determined in comparator 25', a signal appears at the comparator 25' output 2. This signal is transmitted to the S input of flip-flop 28 synchronized by the clock signal H transmitted by the generator 10. The flip-flop 28 is reset to zero by the VAL signal generated via the output of the inverter 12 and applied to the R input of the flip-flop 28.

The transfer gate 9 comprises two AND gates 29 and 30. The AND gate 29 has five inputs. Input 1 is the synchronizing signal T7 transmitted by the sequencer 11. Input 2 receives the signal transmitted via the line 18 from microprocessor 5. Input 3 receives the signal BC transmitted from the output Q of the flip-flop 28 which assumes the logic "1" state when the identity of the results R is detected by the comparator 25'. Input 4 receives a control signal C transmitted by the microprocessor 5 of the device 1'. Input 5 of gate 29 receives the VAL signal transmitted by the inverter 12.

The AND gate 30 also has five inputs. The No. 1 Input 1 receives the control signal C transmitted by the microprocessor 5 of the electronic device 1'. Input 2 receives the signal BC transmitted by the flip-flop 28. Input 3 receives the synchronizing signal T7 transmitted by the sequencer 11. Input 4 receives the data transmitted on line 14 from the portable cards and also is connected to receive the output of AND gate 26. Input 5 is controlled by the VAL signal generated via the output 2 of the inverter 12. The output 6 of the AND gate 30 transmits the data transmitted on line $1_4$ to the line $1_8$.

The electronic device 1', corresponds to device 1 and comprises the memory M or 6 and the microprocessor control device 5 having an input-output D and a gate control output C connected to the transfer gate 9.

Similarly, the portable object 1 includes a memory M or 3, a microprocessor P or 4 having an input-output gate D to which are connected the lines $1_1$ to $1_4$.

The operation of the device illustrated in FIG. 2 is as follows: The presentation of a portable object 1 such as a credit card in the opening F of the facility 2 closes the contact $C_x$. This causes the appearance of the VAL signal at the output terminal of the inverter 12. The VAL signal is applied to the sequencer 11, which controls the cycles T1 to T7 of the sequencer 11 under synchronization of the clock 10. The counter 13 operates permanently under synchronization of the clock 10 as soon as the system as a whole is supplied with electrical power by a source of supply (not illustrated).

The code utilized for the progression of the counter 13 may be selected in a wholly optional manner in the case of FIG. 2, and the number of possible combinations amounts to $2^{n-1}$. At the instant $T_1$, the identification code $I_n$ transmitted by the portable object 1 passes through the AND gate 19 under the control of the $T_1$ output from the sequencer 11 and is recorded in the shift register 18, and the decoder 20 identifies the identification code $I_n$. The output of the code identifier 20 is applied to input 1 of AND gate 23, which also receives the VAL signal at input 2 and the $T_2$ output from synchronizer 11 at input 3.

At the instant $T_2$, if the identification code $I_n$ is correct, the flip-flop 21 is actuated and its Q output actuates the AND gate 15 which for its part controls the transfer of the contents of the ring counter 13 (random number E), into the shift register 14.

At the instant $T_3$, upon receipt of the $T_3$ signal by shift register 14, the random number E contained in the shift register 14 is transmitted in sequence via the output terminal "OUT" of the shift register 14. The output is applied on one hand to the portable object 1 via the line $1_2$ through the AND gate 16, and on the other hand, to the electronic device 1' via line $1_5$, through AND gate 17.

Then, during the instant $T_4$, the microprocessors 4 and 5 contained in the portable object 1 and in the device 1' each calculate the number $R = p(S, E, I_n)$, for example, using the procedure described hereinabove.

At the instant $T_5$, the calculation results R and R' are transmitted on the lines $1_3$ and $1_6$, on the one hand through AND gate 24 to shift register 25 and, on the other hand, through AND gate 27 to shift register 26. The comparison of the results is performed by the comparator 25' connected to receive the outputs of shift registers 25 and 26. If the results are equal, the flip-flop 28 assumes the logic state "1" to supply signal BC, and the transfer of the data between the memory 3 of the portable object 1 and the memory 6 of the electronic device 1' is authorized.

To better enable those skilled in the art to practice the invention without undue experimentation, the following additional designations of components are provided by way of exmple, and not by way of limitation: The clock 10 and the sequencer 11 may be those which are described in commonly-assigned Lemaire et al. U.S. Pat. No. 4,223,392. The shift registers 14, 18, 25 and 26 may each comprise a Texas Instruments Type No. SN74S299. The decoder 20 may comprise a Texas Instruments Type No. SN74L85. The various AND gates may each comprise a Texas Instruments Type No. 74LS21. The J-K flip-flops 21 and 28 may comprise a Texas Instruments Type No. SN54S112. The invertor 12 may comprise a Texas Instruments Type No. SN54S00.

The system for identification of persons which has been described is not limited to the exchange of data between the portable object 1 and the apparatus 2. The apparatus 2 could be utilized for many other applications in particular for access to data banks of data processing systems. It could form part of commercial cash registers, banknote dispensers or other apparatus in which it is desired to control access.

In certain of these cases and without exceeding the scope of the invention, the operation of the portable object 1 upon presentation by its holder may be made conditional upon any chosen password, which the holder would have to submit, for example on a keyboard or on any other kind of transmission device, to permit its verification by means of the portable object 1 itself. In all these cases, the signal BC supplied by the flip-flop 28 may usefully be employed to validate transactions or operations which the operator holding the portable object may wish to perform.

In the same spirit, the example which has been given of a preferred embodiment of the invention is in no way restrictive, and it is evident that any one skilled in the art who is well acquainted with data processing techniques may conceive other forms of the invention without thereby exceeding its scope.

What is claimed is:

1. A process for validating the identification of persons by the presentation of a portable object carried by a person to an apparatus, the portable object including a first memory within which are recorded a first secret code S, a first identification code $I_n$ and a first program p, and a first processor for processing the data recorded in the first portable object memory, and the apparatus including a second memory within which are recorded a second secret code S, a second identification code $I_n$ and a second program p, and a second processor for processing the data recorded in the second apparatus memory, the second codes S and $I_n$ and the second program p recorded in the second memory of the apparatus having a predetermined relationship to the first codes and the first program recorded in the first memory of the portable object; said process comprising:

reading the first identification code $I_n$ recorded in the first memory of the portable object;

identifying whether the first identification code is plausible;

generating a random number E and transmitting the random number to the first and second processors if the first identification code $I_n$ is plausible;

calculating in the two processors respective codes R and R' as a function of the random number of the respective programs p and of the respective identification $I_n$ and secret S codes; and comparing the codes R and R' calculated by the two processors to verify the verisimilitude of the secret code S and of the program p recorded in the memory of the portable object.

2. A system for validating identification of persons, said system comprising:

a portable object adapted to be carried by a person, the portable object including a first memory adapted to have recorded therein a secret code S, an identification code $I_n$ and a program p, and a first processor for processing the data recorded in said first memory; and a facility having means for receiving said portable object and including a second memory wherein are recorded a secret code S, an identification code $I_n$ and a program p, and a second processor for processing the data recorded in said second memory, the codes S and $I_n$ and program p stored in said second memory being identical to those recorded in the first memory of said portable object, said facility further including first means for identifying the identification code $I_n$ recorded in the first memory of the portable object, second means for generating a random number signal E and for transmitting the random number signal to each of said processors, each of said processors being responsive to the random number signal for generating respective code signals R and R' which are a function of the random number signal E transmitted by the said second means and of the identification $I_n$ and secret S codes recorded in the first and second memories, and third means for comparison of the codes R and R' generated by the said first and second processors to verify the verisimilitude of the secret code S and of the program p recorded in the portable object.

3. The process of claim 1, wherein said predetermined relationship is one of equality between the first and second codes and programs.

4. The process of claim 1, wherein said calculating in each processor comprises forming a first intermediate result by concatenating the random number with the identification code; forming a second intermediate result by an exclusive-OR operation between the secret code and the first intermediate result; and calculating said code R or R' by multiplying the secret code by the first and second intermediate results.

5. The system of claim 2, wherein said second memory and second processor are similar to the first memory and the first processor respectively.

6. The system of claim 2, wherein the portable object comprises a credit card embodying said first memory and said first processor.

7. The system of claim 2, wherein the first memory has a secret zone in which reading and writing are permitted only by the first processor and wherein said secret code is stored in said secret zone.

* * * * *